US011163876B2

(12) United States Patent
Hassanshahi et al.

(10) Patent No.: US 11,163,876 B2
(45) Date of Patent: Nov. 2, 2021

(54) GUIDED SECURITY ANALYSIS

(71) Applicant: Oracle International Corporation, Redwood Shores, CA (US)

(72) Inventors: Behnaz Hassanshahi, Brisbane (AU); Hyunjun Lee, Brisbane (AU)

(73) Assignee: Oracle International Corporation, Redwood Shores, CA (US)

( * ) Notice: Subject to any disclaimer, the term of this patent is extended or adjusted under 35 U.S.C. 154(b) by 530 days.

(21) Appl. No.: 16/261,104

(22) Filed: Jan. 29, 2019

(65) Prior Publication Data

US 2020/0242244 A1 Jul. 30, 2020

(51) Int. Cl.
*G06F 7/04* (2006.01)
*G06F 21/56* (2013.01)
*G06F 21/57* (2013.01)
*G06F 8/75* (2018.01)
*G06F 11/36* (2006.01)
*G06F 21/62* (2013.01)

(52) U.S. Cl.
CPC ............. *G06F 21/563* (2013.01); *G06F 8/75* (2013.01); *G06F 11/3612* (2013.01); *G06F 11/3636* (2013.01); *G06F 21/577* (2013.01); *G06F 21/62* (2013.01); *G06F 2201/865* (2013.01); *G06F 2221/033* (2013.01)

(58) Field of Classification Search
CPC ...... G06F 21/563; G06F 8/75; G06F 11/3612; G06F 11/3636; G06F 21/577; G06F 21/62; G06F 2201/865; G06F 2221/033
See application file for complete search history.

(56) References Cited

U.S. PATENT DOCUMENTS

| 8,359,584 | B2* | 1/2013 | Rao | G06F 11/3624 717/133 |
| 8,381,192 | B1* | 2/2013 | Drewry | G06F 11/3636 717/128 |
| 2005/0055565 | A1* | 3/2005 | Fournet | G06F 21/577 726/26 |
| 2010/0293557 | A1* | 11/2010 | Tkachuk | G06F 8/38 719/318 |

(Continued)

OTHER PUBLICATIONS

Mesbah, A. et al., "Crawling Ajax-Based Web Applications Through Dynamic Analysis of User Interface State Changes" ACM Transactions on the Web (TWEB) vol. 6, Issue 1, Article 3, Mar. 2012 (30 pages).

(Continued)

*Primary Examiner* — Hang Pan
(74) *Attorney, Agent, or Firm* — Ferguson Braswell Fraser Kubasta PC

(57) ABSTRACT

A method may include generating a callgraph by performing a static analysis of code that includes event handlers, and selecting, using the callgraph, a state of the code, selecting, using the callgraph, an event enabled in the selected state. The event corresponds to an event handler. The method may further include obtaining an input, obtaining a next state by executing the event handler with the obtained input in the selected state, in response to executing the event handler, generating an input modification rule using the obtained input, and generating, using the input modification rule and the obtained input, a modified input that bypasses a guard in the code that controls access to the point of interest.

20 Claims, 10 Drawing Sheets

(56) References Cited

U.S. PATENT DOCUMENTS

| | | | | |
|---|---|---|---|---|
| 2012/0260132 A1* | 10/2012 | Blue | ................... | G06F 11/3676 |
| | | | | 714/38.1 |
| 2013/0031622 A1* | 1/2013 | Berg | ..................... | G06F 21/577 |
| | | | | 726/17 |
| 2015/0220333 A1* | 8/2015 | Soeder | ...................... | G06F 8/53 |
| | | | | 717/123 |
| 2016/0267271 A1* | 9/2016 | Prasad | .................. | G06F 21/564 |

OTHER PUBLICATIONS

Pellegrino, G. et al., "jÄk: Using Dynamic Analysis to Crawl and Test Modern Web Applications", Research in Attacks, Intrusions, and Defenses (RAID): 18th International Symposium, Kyoto, Japan, Nov. 2-4, 2015 (23 pages).

Fard, A.M. et al., "Feedback-directed Exploration of Web Applications to Derive Test Models", In IEEE 24th International Symposium on Software Reliability Engineering (ISSRE), Nov. 4-7, 2013, pp. 278-287 (10 pages).

Thummalapenta, S. et al., "Guided Test Generation for Web Applications", In Proceedings of the 2013 International Conference on Software Engineering (ICSE), San Francisco, CA, USA, May 18-26, 2013, pp. 162-171 (11 pages).

Feldthaus, A. et al., "Efficient Construction of Approximate Call Graphs for JavaScript IDE Services", 35th International Conference on Software Engineering (ICSE), San Francisco, CA, USA, May 18-26, 2013 (10 pages).

\* cited by examiner

Code Snippet B
450

```
1. function target() { fetch('');}

2. function handle_click() {fn.call(this);}

3. function btn_cb_1() {handle_click();}
4. function btn_cb_2() {handle_click();}

5. <button id='add1' onclick='btn_cb_1()'>
6.   button_1
7. </button>
8. <button id='add2' onclick='btn_cb_2()'>
9.   button_2
10. </button>
```

Added dynamically

FIG. 4C

GUIDED SECURITY ANALYSIS

BACKGROUND

Dynamic analysis techniques are a popular method for finding security vulnerabilities in programs (e.g., web applications). However, the scope of coverage of dynamic analysis depends on the inputs interactively provided to the program, especially for security vulnerability detection. For example, modern web applications often move considerable amounts of computation to the client side and often have complex and highly interactive event-driven user interfaces. Techniques for analyzing and interacting with web applications may be computationally expensive due to the combinatorial number of possible event sequences and resulting states, and thus do not scale to large codebases. Some techniques aim for coverage of user-defined functionality, rather than finding security vulnerabilities, and focus on generating events, without generating input values, and thus do not provide sufficient scope of coverage for a security analysis.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments relate to a method including generating a callgraph by performing a static analysis of code that includes event handlers, selecting, using the callgraph, a state of the code, and selecting, using the callgraph, an event enabled in the selected state. The event corresponds to an event handler. The method further includes obtaining an input, obtaining a next state by executing the event handler with the obtained input in the selected state, in response to executing the event handler, generating an input modification rule using the obtained input, and generating, using the input modification rule and the obtained input, a modified input that bypasses a guard in the code that controls access to the point of interest.

In general, in one aspect, one or more embodiments relate to a system including a memory coupled to a computer processor, a repository configured to store code and a callgraph including event handlers, a code analyzer, executing on the computer processor and using the memory, configured to generate the callgraph by performing a static analysis of the code, select, using the callgraph, a state of the code, and select, using the callgraph, an event enabled in the selected state. The event corresponds to an event handler. The system further includes an input generator, executing on the computer processor and using the memory, configured to obtain an input, obtain a next state by executing the event handler with the obtained input in the selected state, in response to executing the event handler, generate an input modification rule using the obtained input, and generate, using the input modification rule and the obtained input, a modified input that bypasses a guard in the code that controls access to the point of interest.

In general, in one aspect, one or more embodiments relate to a non-transitory computer readable medium including instructions that, when executed by a computer processor, perform: generating a callgraph by performing a static analysis of code that includes event handlers, and selecting, using the callgraph, a state of the code, selecting, using the callgraph, an event enabled in the selected state. The event corresponds to an event handler. The instructions further perform obtaining an input, obtaining a next state by executing the event handler with the obtained input in the selected state, in response to executing the event handler, generating an input modification rule using the obtained input, and generating, using the input modification rule and the obtained input, a modified input that bypasses a guard in the code that controls access to the point of interest.

Other aspects of the invention will be apparent from the following description and the appended claims.

BRIEF DESCRIPTION OF DRAWINGS

FIG. 4A, FIG. 4B, FIG. 4C, FIG. 4D, and FIG. 4E show examples in accordance with one or more embodiments of the invention.

DETAILED DESCRIPTION

Figure 1A:
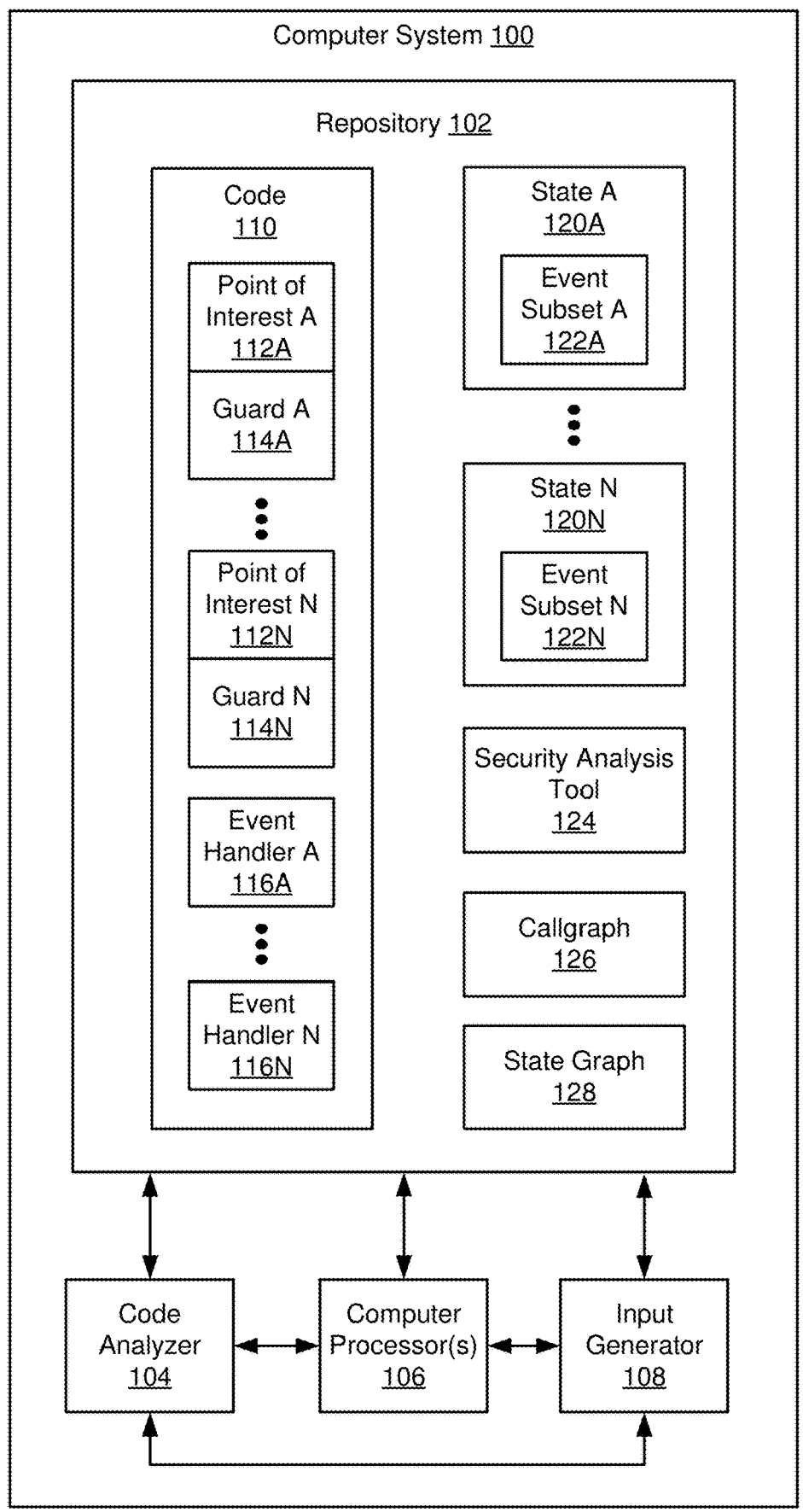
FIG. 1A and FIG. 1B show a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention are directed to a method, system, and computer-readable medium for guided security analysis. In one or more embodiments, the analysis is guided to points of interest (e.g., statements) in the code relevant to a security analysis. For example, the security analysis may be Document Object Model Cross-Site Scripting (DOM-XSS) or Representational State Transfer Application Programming Interface (REST API) analysis. A callgraph may be statically generated for the code, and later refined based on dynamically triggered events. The callgraph provides information that may be used to guide the search through the states and events corresponding to the code. The search is guided to the states and events relevant to the points of interest, resulting in an efficient search that scales well to large codebases. In one or more embodiments, values collected during execution are used to modify inputs to bypass guards (e.g., conditional statements) that control access to the points of interest, thus improving the coverage of the guided security analysis.

FIG. 1A shows a computer system (100) in accordance with one or more embodiments of the invention. As shown in FIG. 1A, the computer system (100) includes a repository (102), a code analyzer (104), one or more computer processors (106), and an input generator (108). In one or more embodiments, the computer system (100) takes the form of the computing system (500) described with respect to FIG. 5A and the accompanying description below or takes the form of the client device (526) described with respect to FIG. 5B. In one or more embodiments, the computer processor(s) (106) takes the form of the computer processor(s) (502) described with respect to FIG. 5A and the accompanying description below.

In one or more embodiments, the repository (102) may be any type of storage unit and/or device (e.g., a file system, database, collection of tables, or any other storage mechanism) for storing data. Further, the repository (102) may include multiple different storage units and/or devices. The multiple different storage units and/or devices may or may not be of the same type or located at the same physical site.

In one or more embodiments, the repository (102) includes code (110), states (120A, 120N), a security analysis tool (124), a callgraph (126), and a state graph (128). In one or more embodiments, the code (110) is a collection of source code. The code (110) may include a collection of computer instructions written in a programming language, or intermediate representation (e.g., byte code). In one or more embodiments, the collection of computer instructions may construct and/or reference various objects.

In one or more embodiments, the code (110) includes points of interest (112A, 112N), guards (114A, 114N), and event handlers (116A, 116N). In one or more embodiments, a point of interest (112A) is a program point (e.g., a statement) that is relevant to a security analysis performed by the security analysis tool (124). For example, the point of interest (112A) may be a security-sensitive function or may correspond to a statement that accesses a security-sensitive resource of the computer system (100). Continuing this example, if the security analysis tool (124) performs a Document Object Model Cross-Site Scripting (DOM-XSS) analysis, then points of interest (112A, 112N) may be statements that access and/or manipulate the DOM. For example, in a DOM-XSS attack, an attack payload controlled at an input location may be executed as a result of modifying the DOM environment in a browser used by client side script, so that the client side code runs in a compromised, possibly malicious manner. Alternatively, if the security analysis tool (124) performs a Representational State Transfer Application Programming Interface (REST API) analysis, then points of interest (112A, 112N) may be Asynchronous JavaScript and XML (AJAX) calls corresponding to client requests and/or server responses.

In one or more embodiments, a point of interest (112A) has a corresponding guard (114A). The guard (114A) may control access to the point of interest (112A). For example, the guard (114A) may be a conditional statement (e.g., an if statement) that determines whether the corresponding point of interest (112A) is executed. Continuing this example, the guard (114A) may compare an input to a constant to determine whether to execute a statement corresponding to the point of interest (112A). Thus, the guard (114A) may function as an input filter that requires an input to satisfy a condition before allowing the input to reach the point of interest (112A).

In one or more embodiments, an event handler (116A) is a function or procedure of the code (110) registered to handle an event. The event handler (116A) may be triggered by an event caused by user interaction with the code (110). For example, the event may be a button click or keystroke in a browser.

Continuing with FIG. 1A, in one or more embodiments, a state (120A) corresponds to a program point (e.g., a statement) in the code (110). Each state (120A) may assign one or more values to one or more memory addresses associated with the corresponding program point. For example, a memory address may correspond to a variable, pointer, etc.

In one or more embodiments, each state (120A, 120N) includes an event subset (122A, 122N) indicating the events enabled in the corresponding state. For example, an event subset (122A) may indicate which user interface buttons are enabled in the corresponding state (120A). When the code (110) is a web application, the state (120A) may further include a uniform resource locator (URL) and/or a DOM tree. In one or more embodiments, executing an event (116A) may cause a transition from one state to another state.

In one or more embodiments, the security analysis tool (124) includes functionality to perform a security analysis of the code (110). For example, the security analysis tool (124) may perform a DOM-XSS analysis or a REST API analysis.

In one or more embodiments, the callgraph (126) includes nodes and edges. In one or more embodiments, a node in the callgraph (126) corresponds to a function call site (e.g., the caller). Alternatively, a node in the callgraph (126) may correspond to a function declaration (e.g., the callee). An edge in the callgraph (126) may correspond to a function invocation.

In one or more embodiments, the state graph (128) includes nodes and edges. In one or more embodiments, nodes in the state graph (128) correspond to states (120A, 120N). Edges in the state graph (128) may correspond to events that cause one state to transition to a second state.

In one or more embodiments, the code analyzer (104) may be implemented in hardware (e.g., circuitry), software, firmware, and/or any combination thereof. In one or more embodiments, the code analyzer (104) includes functionality to generate a callgraph (126). The code analyzer (104) may include functionality to explore states (120A, 120N) in a state graph (128) using prioritization heuristics. The code analyzer (104) may include functionality to select an event using prioritization heuristics.

In one or more embodiments, the computer processor (106) includes functionality to execute the code (110). In one or more embodiments, the computer processor (106) includes functionality to execute the code analyzer (104) and/or the input generator (108).

Figure 1B:
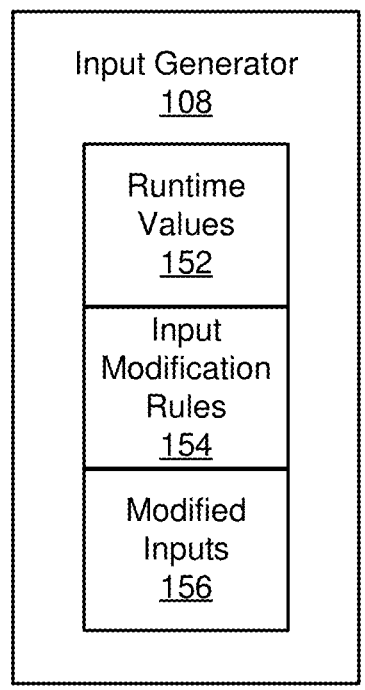

In one or more embodiments, the input generator (108) may be implemented in hardware (e.g., circuitry), software, firmware, and/or any combination thereof. Turning to FIG. 1B, in one or more embodiments, the input generator (108) may include functionality to obtain an input. The input generator (108) may further include functionality to collect runtime values (152) resulting from executing the code (110). In one or more embodiments, the runtime values (152) correspond to guards (114A, 114N). The input generator (108) may further include functionality to generate input modification rules (154) using the runtime values (152). In one or more embodiments, an input modification rule modifies an obtained input to bypass a guard (114A).

The input generator (108) may further include functionality to generate modified inputs (156) using the input modification rules (154).

While FIG. 1A shows a configuration of components, other configurations may be used without departing from the scope of the invention. For example, various components may be combined to create a single component. As another example, the functionality performed by a single component may be performed by two or more components.

Figure 2:
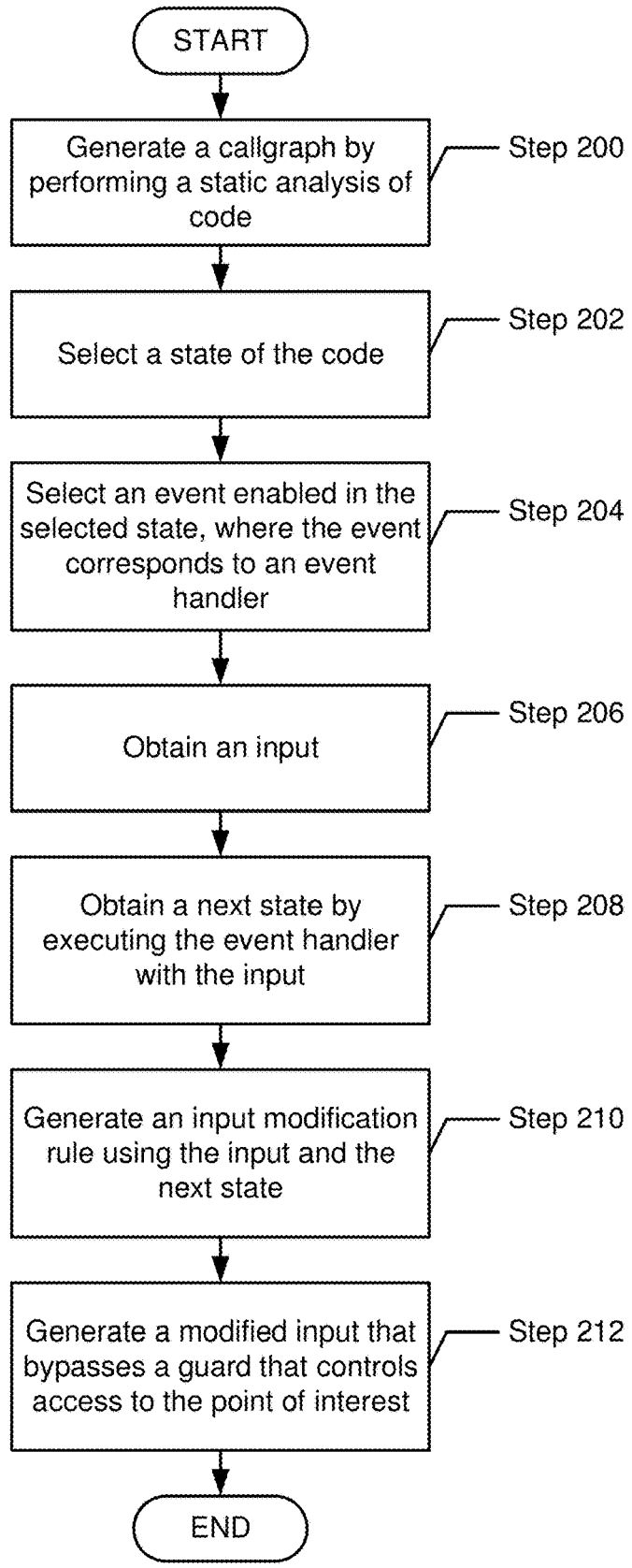
FIG. 2 and FIG. 3 show flowcharts in accordance with one or more embodiments of the invention.

FIG. 2 shows a flowchart in accordance with one or more embodiments of the invention. The flowchart depicts a process for feedback-directed security analysis. One or more of the steps in FIG. 2 may be performed by the components (e.g., the code analyzer (104) and/or input generator (108) of the computer system (100)), discussed above in reference to FIG. 1A. In one or more embodiments of the invention, one or more of the steps shown in FIG. 2 may be omitted, repeated, and/or performed in parallel, or in a different order than the order shown in FIG. 2. Accordingly, the scope of the invention should not be considered limited to the specific arrangement of steps shown in FIG. 2.

Initially, in Step 200, a callgraph is generated by performing a static analysis of the code. In one or more embodiments, the static analysis is a method of analyzing the code without executing the code. In one or more embodiments, the static analysis is a lightweight, efficient analysis that generates an approximate callgraph. For example, precise static analysis of modern web (e.g., JavaScript) applications, which are highly dynamic and interactive, is known to be difficult, and statically generated callgraphs may include false positive and/or false negative edges. Furthermore, it may not be possible to predict which code will be executed, since code may be dynamically received at runtime (e.g., by a web application client, from a server). To improve efficiency, the static analysis may focus on function objects without reasoning about non-functional values. In addition, the static analysis may ignore dynamic property accesses. The callgraph may be adjusted as described in Step 208 below, as event handlers are dynamically executed (e.g., if the code uses a complex library).

In one or more embodiments, when the code is a web application, the code analyzer generates the callgraph by extracting links from HTML pages, starting at a URL. The code analyzer may analyze the code (e.g., an event handler) corresponding to each link. In one or more embodiments, the code analyzer analyzes the code in each file separately. The code analyzer may iteratively crawl over the various links, analyzing the code corresponding to the links. The resulting callgraph may be thought of as a coarse, static approximation of the web application, which may require adjustment as additional code is received at runtime.

In Step 202, a state of the code is selected. In one or more embodiments, the selected state may be an initial state (e.g., an initial state of a browser when a client side application is launched). Alternatively, the code analyzer may select the state from a state graph using one or more state prioritization heuristics. In one or more embodiments, the code analyzer incrementally generates the state graph as new states are obtained due to the execution of event handlers (see description of Step 208 below). The state may correspond to a point of interest in the code. In one or more embodiments, the point of interest is included in a list of points of interest relative to a security analysis. For example, the list of points of interest may correspond to known taint sinks (e.g., security-sensitive functions) used by a security analysis tool when performing the security analysis.

The code analyzer may use the prioritization heuristics to guide the exploration of the states in the state graph. For example, the state graph may be explored via a bounded depth-first search. If the search times out, then it may be preferable to have analyzed, prior to the timeout, the states most relevant to the security analysis.

In one or more embodiments, the code analyzer assigns a high priority to a state that corresponds to the point of interest, and thus the state may be likely to be relevant to the security analysis. In addition, the code analyzer may assign a high priority to a state that has not yet been visited.

In one or more embodiments, the code analyzer may assign a high priority to un-visited states that are similar to a current state, using a similarity metric. When the code is a web application program, the similarity metric may be based on the similarity of the DOM tree of a current state to the DOM tree of other candidate states in the state graph. For example, the similarity metric may measure the similarity of the nodes and edges of the respective DOM trees. The purpose of the similarity metric is to improve browser performance by reducing the overhead of switching the browser state. For example, browser performance may suffer when the browser state switches to an unrelated, dissimilar state.

In one or more embodiments, after prioritizing the states in the state graph, the states are inserted into a state queue in order of their priorities. Thus, the highest priority state may be selected (e.g., in subsequent iterations of Step 202) by popping the first element from the state queue.

Once all states similar to a current state, relative to a similarity threshold, have been visited, the code analyzer may backtrack to a previously visited state. Transitioning to a state may be implemented by triggering a sequence of events resulting in the state, where each event in the sequence triggers a transition from a previous state to a next state. When transitioning between similar states, existing events (e.g., clicking back buttons) may be used.

Backtracking during a depth-first search may require storing browser states in memory, potentially resulting in an exponential increase in memory consumption. In addition, restoring the browser state while coordinating the memory heap state and the DOM state may be challenging. Therefore, instead of storing the states in memory, the event sequences resulting in the desired state may be replayed, starting with the initial state in the state graph. However, replaying event sequences may result in poor performance when the various states on a path are not sufficiently similar. Prioritizing similar states allows a localized state graph search to backtrack to previous states without exploding memory consumption. This heuristic allows prioritization of states that share event sequences with previously visited states, thus reducing browser rendering overhead. In addition, the code analyzer may discover and prioritize an event sequence resulting in the desired state that is shorter (e.g., an event sequence with fewer events) than the event sequence starting with the initial state in the state graph.

In Step 204, an event enabled in the selected state is selected. In one or more embodiments, the selected event has a corresponding event handler. The code analyzer may select the event using one or more event prioritization heuristics. In one or more embodiments, the code analyzer may assign a highest priority to an event whose corresponding event handler node in the callgraph is closest to the node corresponding to the point of interest. For example, the priority of an event may be based on a distance, measured as the number of edges in the callgraph, between the node corresponding to the point of interest, and the node corresponding to the event handler.

In Step 206, an input is obtained. In one or more embodiments, the input is specific to the selected event. Alternatively, the input may be a general input to the code. The input may be obtained in various ways, including: via user interface forms, uniform resource locators (URLs) (e.g., from query parameters or hash identifiers), cookies, local storage, etc. Alternatively, the input may be obtained from an input queue (see description of Step 312 below).

In Step 208, a next state is obtained by executing the event handler with the obtained input in the selected state. In one or more embodiments, the code analyzer adds the next state to the state graph.

When the code is a web application, the event handler may be executed in response to loading a URL in the browser. Executing the event handler may result in a transition to a new state. Alternatively, executing the event handler might not result in a transition to a new state.

In one or more embodiments, the callgraph is modified by performing a static analysis of the event handler. Recall that the callgraph generated in Step 202 above may be a static approximation of the behavior of the code that may not cover all possible runtime behaviors, which might not be predictable in advance. For example, if the event handler corresponds to new code (e.g., dynamically received by a client from a server), then the callgraph may be modified to account for the new code. Continuing this example, new edges may be added to the callgraph corresponding to state transitions caused by executing the new code. In one or more embodiments, the code analyzer modifies the callgraph to remove a "false positive" edge from the statically approximated callgraph that incorrectly indicates a transition between two states. In one or more embodiments, the distances between nodes in the callgraph are recomputed when the callgraph is modified, since some distances may have changed due to the addition and/or removal of edges.

In Step 210, an input modification rule is generated using the obtained input. In one or more embodiments, the input modification rule modifies the obtained input to bypass a guard in the code. See descriptions of Step 212 and Step 310 below.

In Step 212, a modified input is generated, using the input modification rule and the obtained input, that bypasses a guard in the code. The guard may control access to the point of interest. For example, the guard may compare the modified input to the value of a constant or variable in order to determine whether to execute a statement corresponding to the point of interest.

In one or more embodiments, a security analysis is performed relative to the state, using the modified input, to detect security vulnerabilities. Enabling the modified input to bypass the guard and reach the point of interest permits deeper penetration into the code, thus increasing the scope of coverage of the security analysis.

Figure 3:
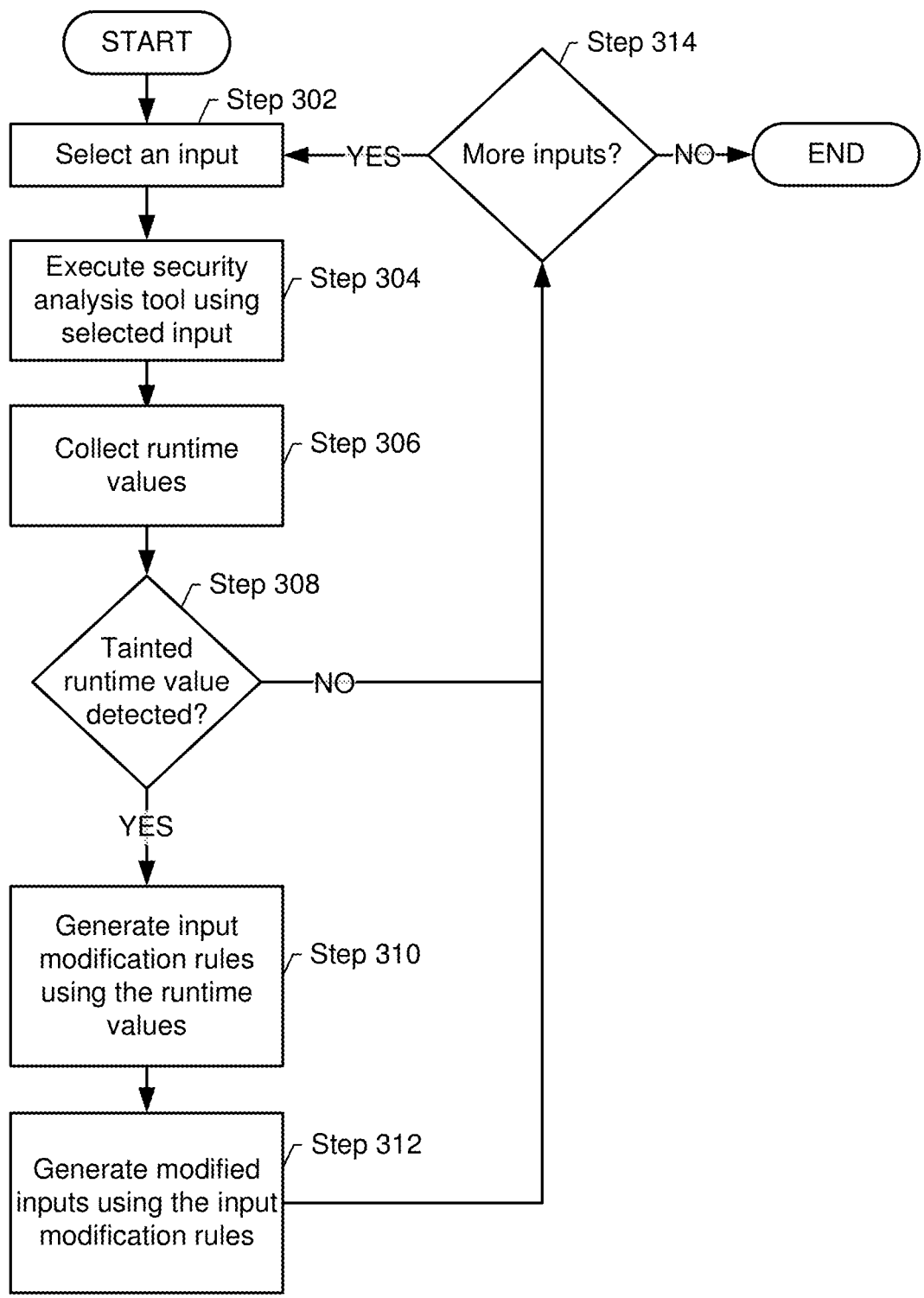

FIG. 3 shows a flowchart in accordance with one or more embodiments of the invention. The flowchart depicts a process for input modification. Moreover, the flowchart in FIG. 3 may correspond to Step 206, Step 208, Step 210, and Step 212 in FIG. 2. One or more of the steps in FIG. 3 may be performed by the components (e.g., the code analyzer (104) and/or input generator (108) of the computer system (100)), discussed above in reference to FIG. 1A. In one or more embodiments of the invention, one or more of the steps shown in FIG. 3 may be omitted, repeated, and/or performed in parallel, or in a different order than the order shown in FIG. 3. Accordingly, the scope of the invention should not be considered limited to the specific arrangement of steps shown in FIG. 3.

Initially, in Step 302, an input is selected (see description of Step 206 above).

In Step 304, a security analysis is performed using the selected input. In one or more embodiments, the input generator passes the selected input to a security analysis tool, which performs the security analysis. When the code is a web application, before the security analysis is performed, the input generator may place the browser in the state selected in Step 202 above by obtaining and triggering an event sequence that results in the selected state. If a security flaw is detected by the security analysis, then a security report may be generated including the type of security flaw, the point of interest (e.g., the line of code corresponding to the point of interest), the tainted input, and/or the tainted value at the point of interest.

In Step 306, runtime values are collected (e.g., logged) as a result of performing the security analysis. Runtime values may be collected for guards (e.g., conditional statements) encountered during execution. In addition, runtime values may be collected for statements of interest to the security analysis tool. For example, if the security analysis tool analyzes the code for DOM-XSS security flaws, then runtime values may be collected for string manipulation functions (e.g., since string functions are often used in input validation statements). The input generator may collect values of the following types of entities: inputs, variables, and/or constants (e.g., constants used in a predicate of a conditional statement).

If, in Step 308, one or more potentially tainted values are detected in the collected runtime values, then Step 310 below is executed. Otherwise, if none of the collected runtime values are potentially tainted, then Step 314 below is executed to check whether there are additional inputs to be selected and processed. In one or more embodiments, one of the potentially tainted values is the selected input. Alternatively, one of the potentially tainted values may be derived from the selected input. For example, a potentially tainted value may be a substring of the selected input.

In one or more embodiments, potentially tainted values are detected using a taint inference mechanism. For example, an efficient taint inference mechanism may be based on correlating values at points of interest in the code with source values at points in the code where potential attacker-controlled input may be received.

A taint inference may be performed by determining a substring relationship between a source value and a point of interest. For example, the taint inference may determine whether there is an exact substring match between the source value and the point of interest (i.e., such that the source value is a substring of the sink value, or vice-versa), relative to a predetermined threshold substring length (e.g., 8 characters).

Alternatively, a taint inference may be performed by determining a similarity score between the source value and the point of interest, relative to a predetermined similarity score threshold. The similarity score may be based on an edit distance between the source value and the point of interest. The edit distance may be based on various algorithms that calculate the distance between string values (e.g., the Levenshtein algorithm, longest common subsequence (LCS) algorithms, etc.). For example, the edit distance may be based on the longest common subsequence (LCS) in the source value and the point of interest, such that LCS is not required to occupy consecutive positions within the source value and/or the point of interest. For example, the LCS of the strings "abdexz" and "acdyz" is "adz". The edit distance may be defined as the minimum number of insert and/or delete operations needed to derive the LCS. The insert and delete operations may be character-level string operations (e.g., such that inserting or deleting N characters is counted as N operations).

When a potential taint flow cannot be ruled out by taint inference, a series of taint checks that analyze the runtime behavior of the code may be performed to determine whether the potential taint flow corresponds to an actual taint flow (e.g., to rule out false positives). Examples of taint checks include evaluating the runtime impact of mutating the source value on the point of interest, and a trace check that analyzes an execution trace between the locations of the source value and the point of interest in the code. The trace check may identify a series of operations that transform the source value into the point of interest. The trace check may identify potentially tainted operations in the execution trace whose arguments or base variables match the source value. For example, the match may be based on a substring relationship, as discussed above. Alternatively, the match may be based on a similarity relationship, for example, where the similarity score between the arguments or base variables of the operation and the source value are within a similarity threshold, as discussed above.

In Step 310, one or more input modification rules are generated using the runtime values collected in Step 306 above. In one or more embodiments, an input modification rule replaces a tainted portion (e.g., a tainted substring) of the selected input with a runtime value. For example, a first runtime value (e.g., based on the selected input) may be the string "xyz123" where the substring "xyz" is inferred to be tainted. In this example, a guard in the code includes a predicate that compares a variable based on the selected input to the substring "abc", a second runtime value. If the predicate is true, then a statement corresponding to a point of interest is executed. An input modification rule may replace the substring "xyz" of the first runtime value with the substring "abc" of the second runtime value. Thus, the input modification rule may impose a constraint on a value that enables the guard to be bypassed. In one or more embodiments, input modification rules may be generated using different types of runtime values. For example, an input modification rule may be generated using numerical runtime values.

In Step 312, one or more modified inputs are generated using the input modification rules (see description of Step 212 above). By applying the input modification rules, one or more modified inputs may bypass the guard and reach the point of interest, effecting deeper penetration into the code. Thus, the scope of coverage of the analysis performed by the security analysis tool may be increased, and more security flaws may be detected. In one or more embodiments, one or more modified inputs are added to an input queue. For example, the inputs in the input queue may be selected by the input generator in subsequent iterations of Step 302 above.

If, in Step 314, it is determined that there are more inputs that have not yet been processed (e.g., the input queue is non-empty), then the input generator again executes Step 302 above to select the next input.

Benchmarks have shown that the aforementioned guided security analysis techniques find both DOM-XSS and REST API vulnerabilities faster, and with deeper coverage, than non-guided techniques.

Figure 4A:
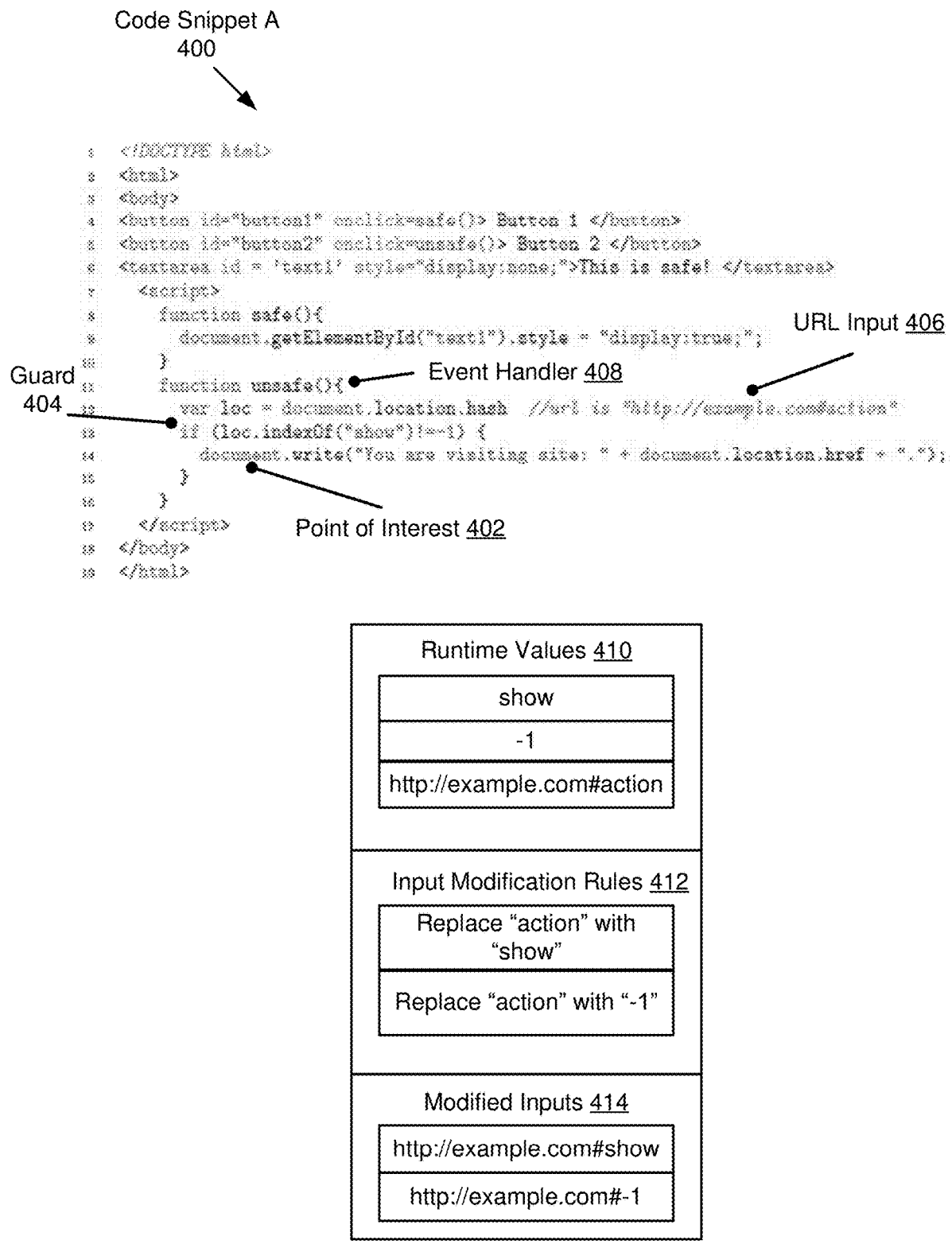

The following example is for explanatory purposes only and not intended to limit the scope of the invention. FIG. 4A, FIG. 4B, FIG. 4C, FIG. 4D, FIG. 4E, and FIG. 4F show implementation examples in accordance with one or more embodiments of the invention. FIG. 4A illustrates the use of input modification to bypass a guard that controls access to a point of interest. In FIG. 4A, code snippet A (400) ((110) in FIG. 1A) corresponds to a hypertext markup language (HTML) page for which a DOM-XSS security analysis will be performed by a security analysis tool ((124) in FIG. 1A). Code snippet A (400) includes a point of interest (402) ((112A) in FIG. 1A) that writes to the document object. The point of interest (402) is vulnerable to attack because a value obtained from the URL input (406) is written to the document object.

When the code analyzer ((104) in FIG. 1A) visits a state corresponding to code snippet A (400) for the first time, the code analyzer adds the state to a graph of states. The code analyzer assigns a high priority to the state because code snippet A (400) contains a point of interest (402). The code analyzer also assigns a high priority to the event whose event handler (408) executes the unsafe function because the event handler (408) has a short distance (relative to a callgraph generated by the code analyzer for code snippet A (400)) to the point of interest (402).

Code snippet A (400) also includes a guard (404) ((114A) in FIG. 1A), a conditional statement that permits access to the point of interest (402) only if document.location.hash contains the "show" keyword. However, the URL input (406) used to load the page is "http://example.com#action", which does not contain "show". Therefore, the point of interest (402) is not executed when the URL input (406) value is used. However, the input generator ((106) in FIG. 1A) guides execution to the point of interest (402) by generating modified inputs (414) in an attempt to bypass the guard (404), and thereby enable deeper coverage of the code snippet A (400) when the security analysis is performed.

First, the input generator places the browser in the state corresponding to code snippet A (400). The input generator then executes the security analysis with the URL input (406), and collects runtime values (410) resulting from the execution of the guard (404), which is potentially tainted. The runtime values (410) include two constant values, "show" and −1, that are used in the guard (404), and the value of a variable, loc, also used in the guard (404). In this case, the value of loc is "http://example.com#action".

Next, the input generator infers that one of the runtime values (410), in this case, the value of the variable loc, is tainted, where the tainted substring is "action". Based on inferring the tainted value, the input generator generates input modification rules (412) using the runtime values (410). The input modification rules (412) replace the tainted substring with runtime values (410), in this case, the constants, "show" and −1. The input generator then applies the input modification rules (412) to the URL input (406), resulting in the modified inputs (414). The input generator subsequently executes the security analysis tool with the modified inputs (414), one of which, "http://example.com#show", bypasses the guard (404). This increases the scope of coverage of the security analysis tool, which detects and reports a security flaw.

Figure 4B:
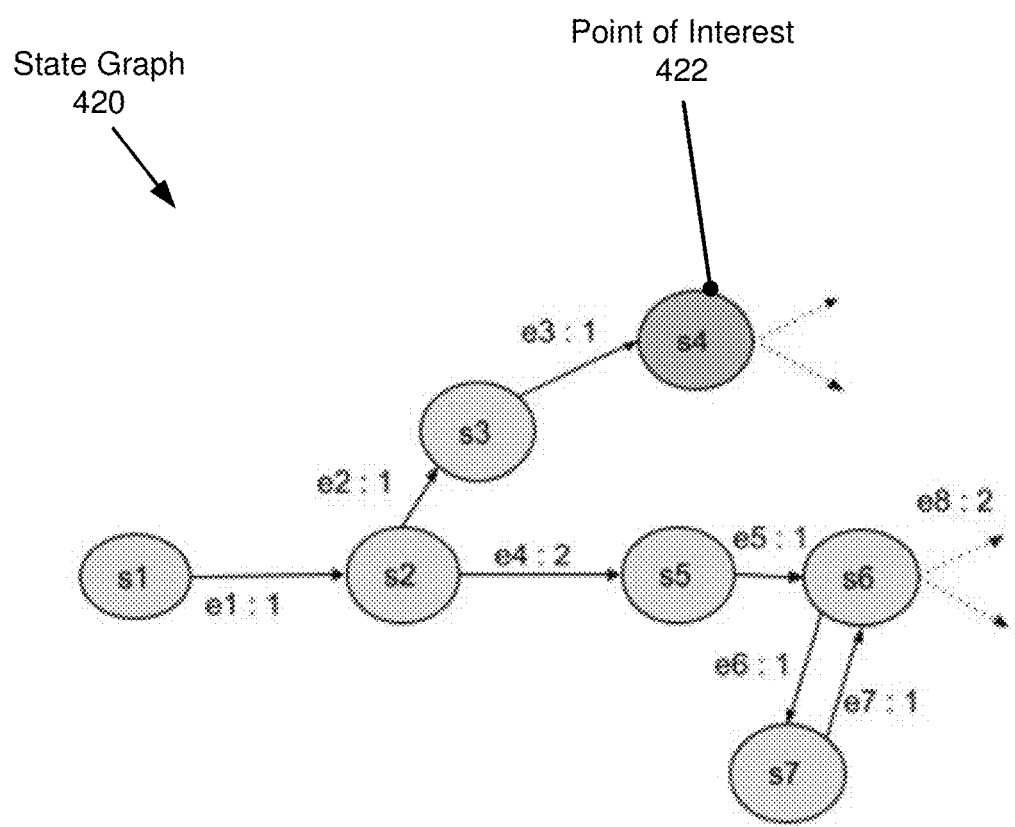

FIG. 4B illustrates state and event prioritization by the code analyzer. FIG. 4B illustrates a state graph (420) that includes nodes corresponding to states, and edges corresponding to events that trigger transitions between states. The code analyzer assigns a prioritization score to each event based on distances between event handlers to points of interest in the callgraph generated by the code analyzer, where shorter distances correspond to higher prioritization scores, and 1 is the highest prioritization score. In FIG. 4B, state s4 corresponds to a point of interest (422). Starting from state s1, the code analyzer triggers event e1 and the browser state transitions to state s2. Next, the code analyzer selects event e2 because the event handler of e2 is closer to the point of interest in the callgraph than the event handler of e4, as indicated by the respective prioritization scores for event e2 and event e4. The code analyzer reaches the point of interest (422) at state s4 after triggering event e1, event e2, and event e3. Next, the code analyzer backtracks (e.g., due to depth-first search) to state s2 and triggers event e4 and event e5. At state s6, the code analyzer triggers event e6 because event e6 has a higher prioritization score than event e8, resulting in a transition to state s7. At this point, the code analyzer backtracks to state s6, which may be accomplished in two ways: 1) replaying the event sequence <e1, e4, e5>, which can result in a significant browser performance overhead, or 2) triggering event e7 that transitions the browser into state s6 in a single step, resulting in a significantly lower browser performance overhead.

Figure 4D:
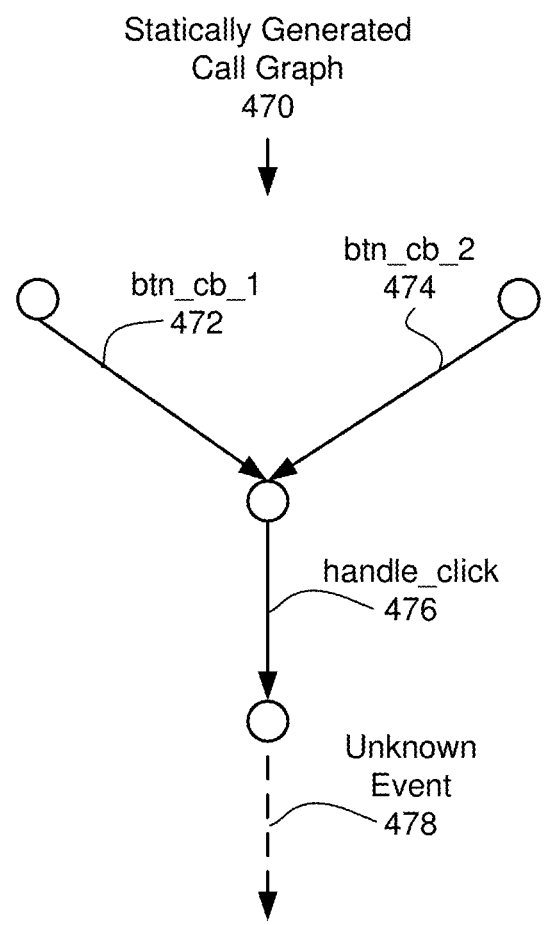

FIG. 4C illustrates refinement of the statically generated callgraph based on events triggered at runtime. In FIG. 4C, code snippet B (450) defines event handlers btn_cb_1 and btn_cb_2 for events add1 and add2. Each event handler invokes the handle_click event, handled by the handle_click function. FIG. 4D illustrates the statically generated callgraph (470), generated by the code analyzer for code snippet B (450) of FIG. 4C. The statically generated callgraph (470) includes edges (472, 474, 476) corresponding to events handled by the event handlers btn_cb_1, btn_cb_2, and handle_click. However, the reference to the fn object in the handle_click function cannot be resolved statically.

Figure 4E:
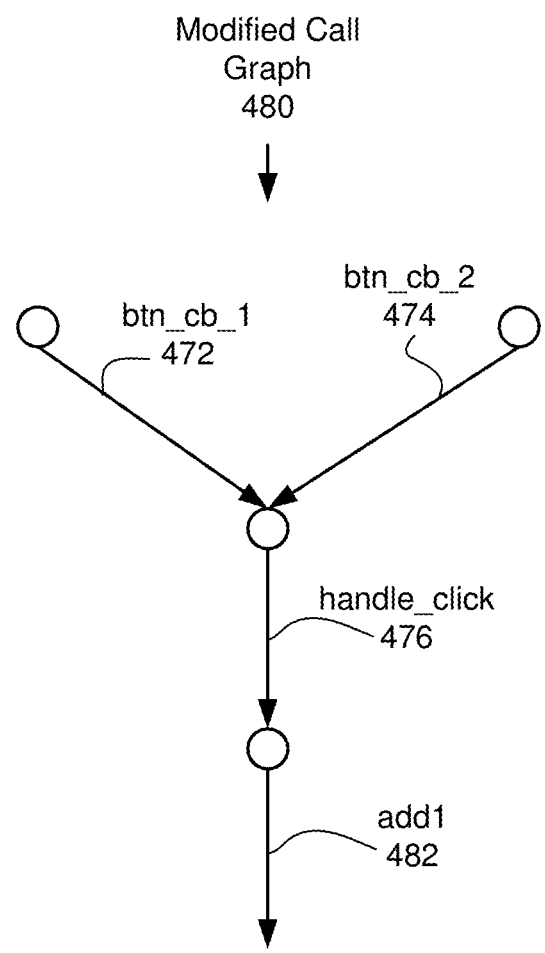

At execution time, once a click has occurred, and one of the event handlers is triggered, the code analyzer refines the statically generated callgraph (470) of FIG. 4D, resulting in a modified callgraph (480), shown in FIG. 4E. The modified callgraph (480) includes an edge (482) corresponding to the event add1, which has been triggered by the handle_click function. Edge (482) was not included in the statically generated callgraph (470) of FIG. 4D. At runtime, the event handler btn_cb_1 is triggered by the browser (e.g., in response to a user click), and the code analyzer discovers edge (482). The code analyzer analyzes the modified callgraph (480), and recomputes the distances between nodes in the modified callgraph (480), which may enable the subsequent prioritization of the event handler btn_cb_2, if necessary.

Figure 5A:
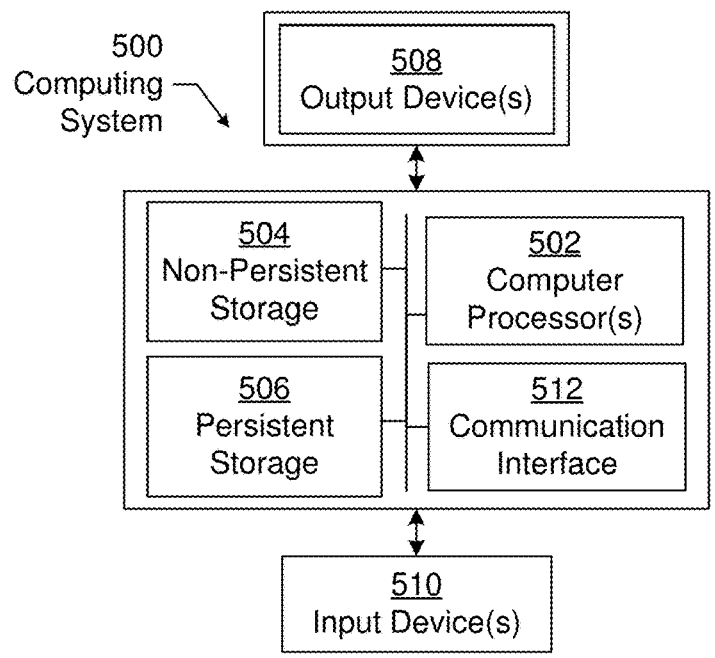
FIG. 5A and FIG. 5B show computing systems in accordance with one or more embodiments of the invention.

Embodiments disclosed herein may be implemented on a computing system. Any combination of mobile, desktop, server, router, switch, embedded device, or other types of hardware may be used. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments disclosed herein may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments disclosed herein.

Figure 5B:
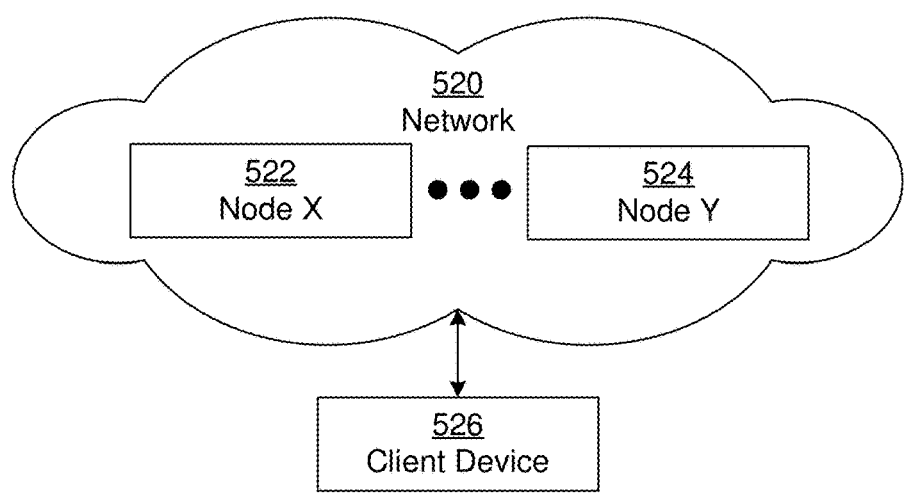

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments disclosed herein may be implemented on a node of a distributed system that is connected to other nodes. By way of another example, embodiments disclosed herein may be implemented on a distributed computing system having multiple nodes, where each portion disclosed herein may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments disclosed herein.

The computing system or group of computing systems described in FIG. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions presents only a few examples of functions performed by the computing system of FIG. 5A and the nodes and/or client device in FIG. 5B. Other functions may be performed using one or more embodiments disclosed herein.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A method, comprising:
generating a callgraph by performing a static analysis of code, wherein the code comprises a plurality of event handlers;
selecting, using the callgraph, a state of the code;
selecting, using the callgraph, an event enabled in the selected state, wherein the event corresponds to an event handler of the plurality of event handlers;
obtaining an input;
obtaining a next state by executing the event handler with the obtained input in the selected state;
in response to executing the event handler, generating an input modification rule using the obtained input; and
generating, using the input modification rule and the obtained input, a modified input that bypasses a guard in the code that controls access to a point of interest in the code.

2. The method of claim 1, further comprising:
detecting, by performing a security analysis and using the modified input, a security flaw corresponding to the point of interest,
wherein the point of interest is based on the security analysis.

3. The method of claim 1, further comprising:
collecting runtime values by performing a security analysis in the selected state using the obtained input; and detecting, in the runtime values, a potentially tainted value,
wherein the input modification rule generates the modified input using one or more of the runtime values.

4. The method of claim 1, wherein the selected state corresponds to the point of interest.

5. The method of claim 1, further comprising:
adding a node corresponding to the next state to a plurality of nodes of a state graph;
exploring a path in the state graph by visiting a subset of the plurality of nodes; and
backtracking from a current node of the subset of the plurality of nodes when each of a group of states similar to a current state has already been visited, wherein the current state corresponds to the current node.

6. The method of claim 1,
wherein the callgraph comprises a plurality of nodes and a plurality of edges,
wherein the plurality of nodes comprise a point of interest node corresponding to the point of interest and a plurality of event handler nodes corresponding to the plurality of event handlers, and
wherein selecting the event comprises comparing a plurality of distances in the callgraph between the point of interest node and the plurality of event handler nodes.

7. The method of claim 6, further comprising:
in response to executing the event handler in the selected state:
adding, to the plurality of edges, an edge corresponding to the execution of the event handler in the selected state; and
recomputing the plurality of distances in the callgraph.

8. A system, comprising:
a memory coupled to a computer processor;
a repository configured to store code and a callgraph comprising a plurality of event handlers;
a code analyzer, executing on the computer processor and using the memory, configured to:
generate the callgraph by performing a static analysis of the code,
select, using the callgraph, a state of the code, and
select, using the callgraph, an event enabled in the selected state, wherein the event corresponds to an event handler of the plurality of event handlers; and
an input generator, executing on the computer processor and using the memory, configured to:
obtain an input,
obtain a next state by executing the event handler with the obtained input in the selected state,
in response to executing the event handler, generate an input modification rule using the obtained input, and
generate, using the input modification rule and the obtained input, a modified input that bypasses a guard in the code that controls access to a point of interest in the code.

9. The system of claim 8, wherein the code analyzer is further configured to:
detect, by performing a security analysis and using the modified input, a security flaw corresponding to the point of interest,
wherein the point of interest is based on the security analysis.

10. The system of claim 8, wherein the input generator is further configured to:
collect runtime values by performing a security analysis in the selected state using the obtained input; and
detect, in the runtime values, a potentially tainted value,
wherein the input modification rule generates the modified input using one or more of the runtime values.

11. The system of claim 8, wherein the selected state corresponds to the point of interest.

12. The system of claim 8, wherein the code analyzer is further configured to:
add a node corresponding to the next state to a plurality of nodes of a state graph,
explore a path in the state graph by visiting a subset of the plurality of nodes, and
backtrack from a current node of the subset of the plurality of nodes when each of a group of states similar to a current state has already been visited, wherein the current state corresponds to the current node.

13. The system of claim 8,
wherein the callgraph comprises a plurality of nodes and a plurality of edges,
wherein the plurality of nodes comprise a point of interest node corresponding to the point of interest and a plurality of event handler nodes corresponding to the plurality of event handlers, and
wherein the code analyzer is further configured to select the selected event by comparing a plurality of distances in the callgraph between the point of interest node and the plurality of event handler nodes.

14. The system of claim 13, wherein the code analyzer is further configured to:
in response to executing the event handler in the selected state:
add, to the plurality of edges, an edge corresponding to the execution of the event handler in the selected state, and
recompute the plurality of distances in the callgraph.

15. A non-transitory computer readable medium comprising instructions that, when executed by a computer processor, perform:
generating a callgraph by performing a static analysis of code, wherein the code comprises a plurality of event handlers;
selecting, using the callgraph, a state of the code;
selecting, using the callgraph, an event enabled in the selected state, wherein the event corresponds to an event handler of the plurality of event handlers;
obtaining an input;
obtaining a next state by executing the event handler with the obtained input in the selected state;
in response to executing the event handler, generating an input modification rule using the obtained input; and
generating, using the input modification rule and the obtained input, a modified input that bypasses a guard in the code that controls access to a point of interest in the code.

16. The non-transitory computer readable medium of claim 15, further comprising instructions that perform:
detecting, by performing a security analysis and using the modified input, a security flaw corresponding to the point of interest,
wherein the point of interest is based on the security analysis.

17. The non-transitory computer readable medium of claim 15, further comprising instructions that perform:
collecting runtime values by performing a security analysis in the selected state using the obtained input; and
detecting, in the runtime values, a potentially tainted value,
wherein the input modification rule generates the modified input using one or more of the runtime values.

18. The non-transitory computer readable medium of claim 15, further comprising instructions that perform:
- adding a node corresponding to the next state to a plurality of nodes of a state graph;
- exploring a path in the state graph by visiting a subset of the plurality of nodes; and
- backtracking from a current node of the subset of the plurality of nodes when each of a group of states similar to a current state has already been visited, wherein the current state corresponds to the current node.

19. The non-transitory computer readable medium of claim 15,
- wherein the callgraph comprises a plurality of nodes and a plurality of edges,
- wherein the plurality of nodes comprise a point of interest node corresponding to the point of interest and a plurality of event handler nodes corresponding to the event handlers, and
- wherein selecting the event comprises comparing a plurality of distances in the callgraph between the point of interest node and the plurality of event handler nodes.

20. The non-transitory computer readable medium of claim 19, further comprising instructions that perform:
- in response to executing the event handler in the selected state:
  - adding, to the plurality of edges, an edge corresponding to the execution of the event handler in the selected state; and
  - recomputing the plurality of distances in the callgraph.

\* \* \* \* \*